(12) United States Patent
de Gaia et al.

(10) Patent No.: US 12,222,896 B1
(45) Date of Patent: Feb. 11, 2025

(54) CUSTOMER DATA ANALYTICS PLATFORM

(71) Applicant: Wells Fargo Bank, N.A., San Francisco, CA (US)

(72) Inventors: Jasmine de Gaia, Lewis Center, OH (US); Tata Sai Ramakrishna Rao, Matthews, NC (US); Karthik Birudavolu, Walpole, MA (US); Subodh K. Samal, Harrisburg, NC (US); Sudhakar Pyndi, Charlotte, NC (US); Rajasekhar Madugula, Monroe Township, NJ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 57 days.

(21) Appl. No.: 18/167,639

(22) Filed: Feb. 10, 2023

(51) Int. Cl.
*G06F 16/11* (2019.01)

(52) U.S. Cl.
CPC ................. *G06F 16/125* (2019.01)

(58) Field of Classification Search
CPC .............................. G06F 16/122; G06F 16/125
See application file for complete search history.

(56) References Cited

U.S. PATENT DOCUMENTS

| | | | | |
|---|---|---|---|---|
| 11,720,548 B1 * | 8/2023 | Opincariu | ......... | G06F 16/24552 707/600 |
| 2007/0192478 A1 * | 8/2007 | Louie | ...................... | G06Q 10/06 709/224 |
| 2011/0029520 A1 * | 2/2011 | Leary | .................... | G06F 16/125 707/E17.046 |
| 2016/0092490 A1 * | 3/2016 | Shimozono | ............. | G06F 3/067 707/688 |
| 2018/0365627 A1 * | 12/2018 | Mansour | ........ | G06Q 10/063118 |
| 2020/0117824 A1 * | 4/2020 | Upadhyay | ............. | G06F 16/258 |
| 2020/0364764 A1 * | 11/2020 | Stödtler | ............. | G06Q 30/0635 |
| 2021/0034581 A1 * | 2/2021 | Boven | ................... | G06F 16/212 |
| 2022/0318204 A1 * | 10/2022 | Sinha | .................... | G06F 16/188 |

OTHER PUBLICATIONS

Zhang et al. "Exploiting User Activeness for Data Retention in HPC Systems," SC21: International Conference for High Performance Computing, Networking, Storage and Analysis, St. Louis, MO, USA, 2021, pp. 1-14, doi: 10.1145/3458817.3476201. (Year: 2021).*

(Continued)

*Primary Examiner* — James E Richardson
(74) *Attorney, Agent, or Firm* — Shumaker & Sieffert, P.A.

(57) ABSTRACT

A computing system is disclosed that comprises a shared platform that provides a unified environment for a set of users to access, analyze and experiment with data from one or more cloud-based or on-premises data sources. The computing system ingests data from the one or more data sources into the shared platform, and monitors activities initiated by the set of users with respect to the data stored within the shared platform on a per-user basis. In response to a portion of the data being stored within the shared platform for a threshold duration, the computing system determines a current level of activity performed by the set of users with respect to the portion of the data and, in response to the current level of activity being less than a minimum level of activity, automatically purges the portion of the data from the shared platform.

19 Claims, 8 Drawing Sheets

(56) References Cited

OTHER PUBLICATIONS

"Amazon EMR: Easily run and scale Apache Spark, Hive, Presto, and other big data workloads", Amazon Web Services, Retrieved from: https://aws.amazon.com/emr/, Accessed on: Apr. 20, 2023, 4 pp.

"Amazon Redshift: Best price-performance for cloud data warehousing", Amazon Web Services, Retrieved from: https://aws.amazon.com/redshift/, Accessed on: Apr. 20, 2023, 4 pp.

"Amazon SageMaker: Machine Learning—Amazon Web Services", Amazon Web Services, Retrieved from: https://aws.amazon.com/sagemaker/, Accessed on: Apr. 20, 2023, 5 pp.

"Amazon Timestream", Amazon Web Services, Retrieved from: https://aws.amazon.com/timestream/, Accessed on: Apr. 20, 2023, 3 pp.

"Analytics end-to-end with Azure Synapse", Microsoft, Retrieved from: https://docs.microsoft.com/en-US/azure/architecture/example-scenario/dataplate2e/data-platform-end-to-end?tabs=portal, Accessed on: Apr. 20, 2023, 14 pp.

"AWS CodeCommit", Amazon Web Services, Retrieved from: https://aws.amazon.com/codecommit/, Accessed on: Apr. 20, 2023, 3 pp.

"AWS Data Pipeline", Amazon Web Services, Retrieved from: https://aws.amazon.com/datapipeline/, Accessed on: Apr. 20, 2023, 3 pp.

"AWS Glue", Amazon Web Services, Retrieved from: https://aws.amazon.com/glue, Accessed on: Apr. 20, 2023, 3 pp.

"AWS Lake Formation", Amazon Web Services, Retrieved from: https://aws.amazon.com/lake-formation/, Accessed on: Apr. 20, 2023, 3 pp.

"AWS Monitoring Tools and Best Practices: Monitor What Matters", NetApp BlueXP, Retrieved from: https://bluexp.hetapp.com/blog/aws-blg-aws-monitoring-tools-and-best-practices-monitor-what-matters, Dec. 10, 2020, 7 pp.

"Azure Data Explorer", Microsoft, Retrieved from: https://azure.microsoft.com/services/data-explorer, Accessed on: Apr. 20, 2023, 22 pp.

"Azure Data Lake Storage", Microsoft, Retrieved from: https://azure.microsoft.com/en-US/products/storage/data-lake-storage/, Accessed on: Apr. 20, 2023, 21 pp.

"Azure Databricks", Microsoft, Retrieved from: https://azure.microsoft.com/en-US/products/databricks/, Accessed on: Apr. 20, 2023, 21 pp.

"Azure HDInsight", Microsoft, Retrieved from: https://azure.microsoft.com/services/hdinsight, Accessed on: Apr. 20, 2023, 20 pp.

"Azure Machine Learning", Microsoft, Retrieved from: https://azure.microsoft.com/en-US/services/machine-learning/, Accessed on: Apr. 20, 2023, 44 pp.

"Azure Monitor", Microsoft, Retrieved from: https://azure.microsoft.com/en-US/products/monitor/, Accessed on: Apr. 20, 2023, 20 pp.

"Azure Synapse Analytics", Microsoft, Retrieved from: https://azure.microsoft.com/en-US/services/synapse-analytics/, Accessed on: Apr. 20, 2023, 24 pp.

"Enterprise data warehouse", Microsoft, Retrieved from: https://learn.microsoft.com/en-US/azure/architecture/solution-deas/articles/enterprise-data-warehouse, Accessed on: Apr. 20, 2023, 4 pp.

"Managing your storage lifecycle", Amazon Web Services, Retrieved from: https://docs.aws.amazon.com/AmazonS3/latest/userguide/object-lifecycle-mgmt.html, Accessed on: Apr. 20, 2023, 2 pp.

"Purge the Service Management Automation database", Microsoft, Mar. 7, 2023, 2 pp.

Agarwal, "Query any data source with Amazon Athena's new federated query", Amazon Web Services, Nov. 26, 2019, 10 pp.

Komninos et al., "How to delete user data in an AWS data lake", Amazon Web Services, Sep. 18, 2020, 9 pp.

* cited by examiner

| VOLUME NAME | QUOTA (GB) | TOTAL USAGE (GB) | USED % | DATA NO COMPRESSION (GB) | DATA COMPRESSION (GB) | SNAPSHOT (GB) | CREATE DATE | LAST ACCESS DATE |
|---|---|---|---|---|---|---|---|---|
| TEAMSPACE 1 | 5120 | 116.16 | 2.27% | 265.48 | 116.16 | 0.00 | 2021-10-07 | 2022-09-06 |
| TEAMSPACE 2 | 1024 | 3.58 | 0.35% | 5.83 | 3.58 | 0.00 | 2022-02-22 | 2022-09-06 |
| TEAMSPACE 3 | 5120 | 1.34 | 0.03% | 2.96 | 1.34 | 0.00 | 2021-10-07 | 2022-09-06 |
| TEAMSPACE 4 | 5120 | 0.89 | 0.02% | 1.77 | 0.89 | 0.00 | 2021-10-07 | 2022-09-06 |

FIG.7

CUSTOMER DATA ANALYTICS PLATFORM

TECHNICAL FIELD

The disclosure relates to computer-based systems for managing data in a shared platform.

BACKGROUND

Analytical platforms enable businesses or enterprises to collect, store, clean, and analyze large amounts of data. Such platforms may provide analysts the ability to create a dataset and develop predictive models, e.g., using machine learning algorithms, or otherwise analyze the dataset to gain business insights. In order to create the dataset, analysts first need to search and access data from across sources; normalize, reconcile, or clean the data to ensure accuracy and eliminate redundancies and discrepancies; and move or merge the data into a single dataset.

SUMMARY

In general, this disclosure describes a computing system comprising a shared platform that provides a unified exploratory environment for one or more technical and nontechnical users to access, analyze and experiment with data from one or more cloud-based or on-premises data sources. The computing system monitors user activities, including access to and interaction with the data ingested into the shared platform, on a per-user basis. More specifically, the computing system is configured to monitor activities initiated by a set of users based on unique user identifiers (IDs) assigned to each user of the set of users. The computing system is also configured to monitor a duration over which the data is stored within the shared platform and automatically purge unused data stored within the shared data platform after a threshold duration to ensure compliance with policies and standards set forth by an industry or enterprise.

In particular, for a portion of data that has been stored within the shared platform for the threshold duration, the computing system determines a level of activity performed by the set of users with respect to the portion of the data stored within the shared platform. If the computing system determines the current level of activity for the portion of the data stored within the shared platform is less than a minimum level of activity, the computing system automatically purges the portion of the data from the shared platform. The computing system may determine the level of activity for the portion of the data based on the monitored activities associated with the unique user IDs of the set of users.

The techniques of this disclosure may provide one or more advantages. The ability to monitor activities in a shared platform on a per-user basis may provide administrators with better control and visibility over data usage, data entitlements, and data management within a business or enterprise. As such, the disclosed computing system may make it easier to identify and address potential issues, such as data misuse and/or security breaches. Additionally, the ability to monitor data request and data ingestion activities in the shared platform on a per-user basis may enable administrators to ensure that data ingested into the shared platform is from a reputable source, which may increase the overall credibility of the platform and trust from users and business stakeholders. Automatic data purging may also prevent issues pertaining to data storage and management. For example, data retention policies and/or regulations may define data access restrictions such that customer private data or personal identification information (PII) can only be stored in an accessible database for a certain period of time. The disclosed techniques provide automated monitoring of data usage and storage durations in the shared platform accessible by the set of users and automated purging as necessary under the policies and/or regulations based on the monitored data usage and storage durations. In this way, the disclosed techniques ensure compliance with the applicable policies and/or regulations and avoid potential security and privacy risks for both the business or enterprise and for the customers.

In one example, this disclosure is directed to a system comprising a memory that stores executable components; and one or more processors in communication with the memory. The one or more processors are configured to: ingest data into a shared platform accessible by a set of users, wherein the data is ingested from one or more data sources of a plurality of cloud-based or on-premises data sources; monitor activities initiated by the set of users with respect to the data stored within the shared platform based on unique user identifiers (IDs) assigned to each user of the set of users, wherein the activities include access to and interaction with the data within the shared platform on a per-user basis; in response to a portion of the data being stored within the shared platform for a threshold duration, determine a current level of activity performed by the set of users with respect to the portion of the data within the shared platform; and in response to the current level of activity for the portion of the data being less than a minimum level of activity, automatically purge the portion of the data from the shared platform.

In another example, this disclosure is directed to a method comprising: ingesting data into a shared platform accessible by a set of users, wherein the data is ingested from one or more of a plurality of cloud-based or on-premises data sources; monitoring activities initiated by the set of users with respect to the data stored within the shared platform based on unique user identifiers (IDs) assigned to each user of the set of users, wherein the activities include access to and interaction with the data within the shared platform on a per-user basis; in response to a portion of the data being stored within the shared platform for a threshold duration, determining a current level of activity performed by the set of users with respect to the portion of the data within the shared platform; and in response to the current level of activity for the portion of the data being less than a minimum level of activity, automatically purging the portion of the data from the shared platform.

In a further example, this disclosure is directed to a non-transitory computer-readable storage medium storing instructions that, when executed, cause one or more processors to: ingest data into a shared platform accessible by a set of users, wherein the data is ingested from one or more of a plurality of cloud-based or on-premises data sources; monitor activities initiated by the set of users with respect to the data stored within the shared platform based on unique user identifiers (IDs) assigned to each user of the set of users, wherein the activities include access to and interaction with the data within the shared platform on a per-user basis; in response to a portion of the data being stored within the shared platform for a threshold duration, determine a current level of activity performed by the set of users with respect to the portion of the data within the shared platform; and in response to the current level of activity for the portion of the data being less than a minimum level of activity, automatically purge the portion of the data from the shared platform.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 7 is a conceptual diagram illustrating an example user interface presented by an administrator computing device for monitoring data usage and data access in the shared platform.

DETAILED DESCRIPTION

Figure 1:
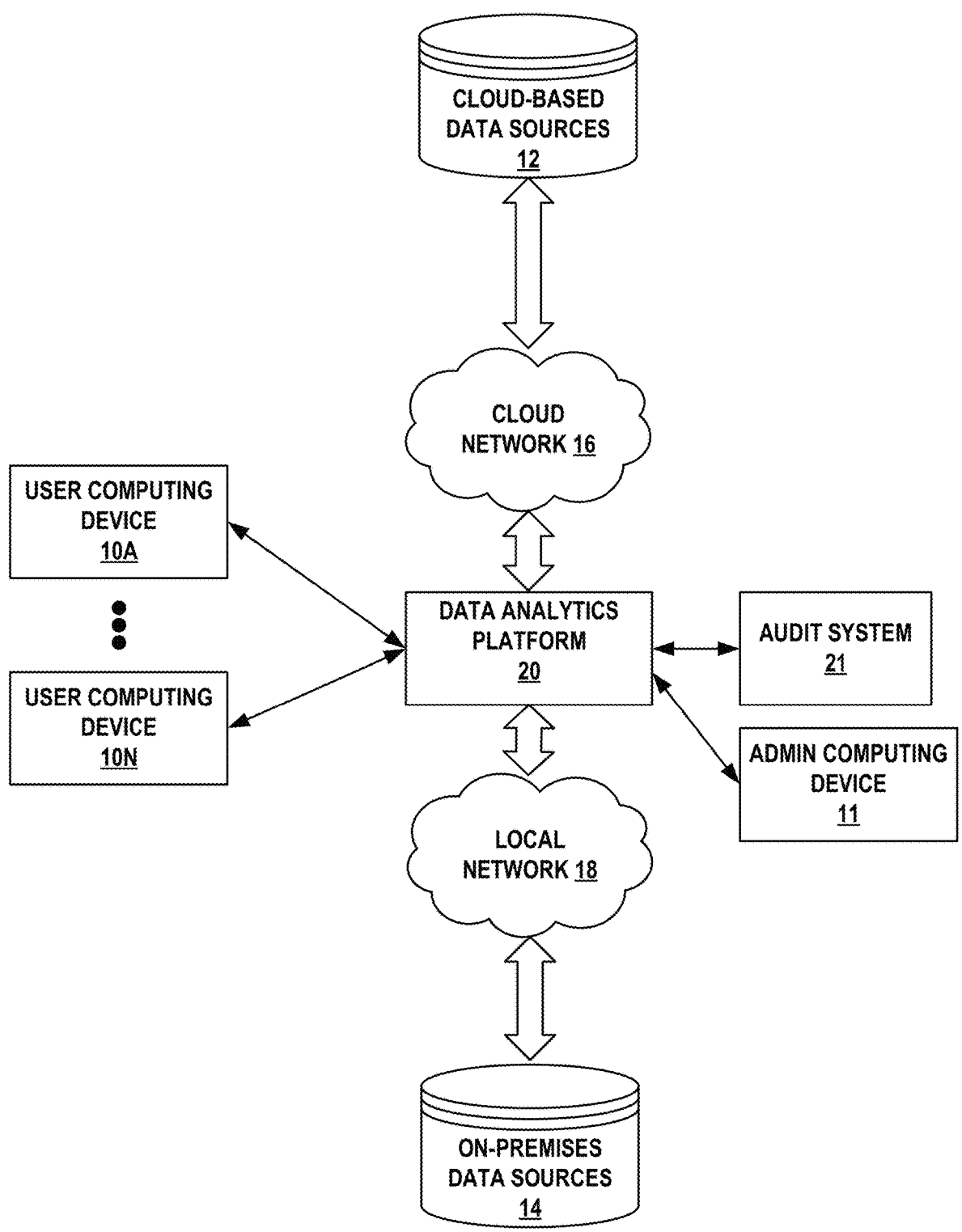
FIG. 1 is a conceptual diagram illustrating an example network system that includes a data analytics platform configured to ingest data from one or more cloud-based or on-premises data sources into a shared platform accessible by a set of user computing devices, in accordance with one or more techniques of this disclosure.

FIG. 1 is a conceptual diagram illustrating an example network system that includes a data analytics platform configured to ingest data from one or more cloud-based or on-premises data sources into a shared platform accessible by a set of user computing devices, in accordance with one or more techniques of this disclosure. The illustrated system of FIG. 1 includes a data analytics platform 20 that is in communication with user computing devices 10A-10N (collectively, "user computing devices 10"), an administrator computing device 11, and an audit system 21. Data analytics platform 20 also has access to one or more cloud-based data sources 12 via cloud network 16 and access to one or more on-premises data sources 14 via local network 18.

Data analytics platform 20 may comprise a centralized or distributed system of computing devices, such as desktop computers, laptops, workstations, wireless devices, cloud-based compute nodes, network-ready appliances, file servers, print servers, or other devices. Alternatively, or in addition, data analytics platform 20 may be implemented through virtualized compute instances (e.g., virtual machines, containers) of a data center, cloud computing system, server farm, and/or server cluster. In some examples, data analytics platform system 20 may be implemented as a cloud-based service, allowing users, via user computing devices 10, to access data analytics platform system 20 and the data stored within data analytics platform system 20 from any location. In another embodiment, data analytics platform system 20 may be implemented as an on-premises system, allowing users, via user computing devices 10, to access data analytics platform system 20 and the data stored within data analytics platform system 20 via local network 18.

In some examples, cloud network 16 and/or local network 18 may be a private network or a public network. Although each are illustrated as a single entity, cloud network 16 and/or local network 18 may include a combination of two or more public and/or private networks. Cloud network 16 may include one or more of a wide area network (WAN) (e.g., the Internet), a virtual private network (VPN), or another wireless communication network. Local network 18 may include one or more of a local area network (LAN) or another wired or wireless communication network. In some examples, cloud network 16 and/or local network 18 may be a service provider network coupled to one or more networks administered by other providers, and may thus form part of a large-scale public network infrastructure, e.g., the Internet.

As illustrated in FIG. 1, each of user computing devices 10 is in communication with analytics platform system 20 over a public or private network (not shown in FIG. 1). Each of user computing devices 10 may be operated by one or more users or analysts. One or more of user computing devices 10 may be associated with users that are members of a team. In some examples, data analytics platform 20 may support a plurality of shared platforms that are each accessible by a different team or set of users or analysts via user computing devices 10 to interact with data ingested into the respective shared platform. For example, users of user computing devices 10A and 10B may be included in a first set of users for which data analytics platform 20 provides access to a first shared platform, and users of user computing device 10N may be included in a second set of users for which data analytics platform 20 provides access to a second shared platform.

Data analytics platform 20 comprises an analytical platform configured to enable a business or enterprise to collect, store, clean, and analyze large amounts of data, e.g., data ingested from one or more of cloud-based data sources 12 and/or on-premises data sources 14. Data analytics platform 20 may provide users or analysts associated with user computing devices 10 the ability to create a dataset and develop predictive models, e.g., using machine learning algorithms, or otherwise analyze the dataset to gain business insights. Data analytics platform 20 may enable users to search and access data from across sources; normalize, reconcile, or clean the data to ensure accuracy and eliminate redundancies and discrepancies; and move or merge the data into a single dataset.

In accordance with the techniques of this disclosure, data analytics platform 20 includes at least one shared platform that provides a unified exploratory environment for one or more technical and nontechnical users via user computing devices 10 to access, analyze and experiment with data from one or more cloud-based data sources 12 and/or on-premises data sources 14. More specifically, data analytics platform 20 ingests data from one or more of cloud-based data sources 12 and/or on-premises data sources 14 into a shared platform accessible by a set of users of user computing devices 10. Data analytics platform 20 further monitors activities performed on the data that are initiated by the set of users on a per-user basis. For example, data analytics platform 20 uses unique user identifiers (IDs) assigned to each user of the set of users of user computing devices 10. The monitored activities, in some examples, include access to and interaction with the data within the shared platform on a per-user basis.

Data analytics platform 20 is also configured to monitor a duration over which the data is stored within the shared platform and automatically purge unused data stored within the shared data platform after a threshold duration to ensure compliance with policies and standards set forth by an industry or enterprise. In particular, for a portion of data that has been stored within the shared platform for the threshold duration, data analytics platform 20 determines a level of activity performed by the set of users of user computing devices 10 with respect to the portion of the data stored within the shared platform. If data analytics platform 20 determines the current level of activity for the portion of the data stored within the shared platform is less than a minimum level of activity, data analytics platform 20 automatically purges the portion of the data from the shared platform. Conversely, if data analytics platform 20 determines that the current level of activity for the portion of the data stored within the shared platform is greater than or equal to the minimum level of activity, data analytics platform 20 may automatically maintain the portion of the data within the shared platform. Data analytics platform 20 may determine the level of activity for the portion of the data based on the monitored activities associated with the unique user IDs of the set of users of user computing devices 10.

According to some aspects of the present disclosure, data analytics platform 20 ingests base data directly from the one or more data sources 12, 14 into a production data storage cluster that is not accessible by the set of users of user computing devices 10. After the ingestion of base data, data analytics platform 20 mirrors the base data into a shared data storage cluster of the shared platform that is accessible by the set of users of the user computing devices 10. In some examples, data analytics platform 20 receives a data request from one user of the set of users of user computing devices 10 and, in response to the data request from the user, data analytics platform 20 initiates the ingestion of the requested data into the product data storage cluster. The data request and subsequent data ingestion may be monitored activities associated with the unique user IDs assigned to the set of users. Data analytics platform 20 may subsequently purge, remove, or delete the data from the shared storage cluster of the shared platform but maintain the base data in the production data storage cluster.

According to other aspects of the present disclosure, to monitor the activities initiated by the set of users, data analytics platform 20 may receive a data request from one user of the set of users of user computing devices 10 and, in response to the data request from the user, access an external system based on a system ID assigned to the system and initiates ingestion of the data. Data analytics platform 20 may map the data request and subsequent access and data ingestion as monitored activities based on the system ID to the unique user ID assigned to the requesting user. Similarly, to monitor the activities initiated by the set of users, data analytics platform 20 may monitor access to one or more source code repositories based on a unique user ID of a user of the set of users who initiated the access, wherein the one or more source code repositories are configured to support code collaboration and reuse between the users of the set of users.

According to some other aspects of the present disclosure, data analytics platform 20 may be configured to generate a user interface for display on user computing devices 10 associated with the set of users. The user interface, in some examples, comprises a search component configured receive search requests from the set of users via the associated user computing devices 10. Data analytics platform 20 may perform a search in a data catalog for data specified in a search request received from a user of the set of users of user computing device 10, wherein the data catalog comprises the data ingested from one or more of the plurality of cloud-based data sources 12 and/or on-premises data sources 14. In some examples, to monitor activities initiated by the set of users, data analytics platform 20 monitors the search based on the unique user ID of the user of the set of users from which the search request was received.

According to some other aspects of the present disclosure, in response to a particular portion of the data being stored within the shared platform for the threshold duration and the current level of activity for the portion of the data being less than the minimum level of activity, data analytics platform 20 may send a notification to one of user computing devices 10 associated with at least one user of the set of users of the shared platform that indicates a date by which the particular portion of the data will be automatically purged from the shared platform. In some examples, data analytics platform 20 may receive, from the one of computing devices 10 in response to the notification, user input data indicating a reason to maintain the portion of the data within the shared platform beyond the threshold duration.

In some examples, data analytics platform 20 may provide output or reports of the per-user monitored activities with respect to the data stored in a particular shared platform to audit system 21 or other external systems associated with data policy compliance or risk mitigation. For example, data analytics platform 20 may be configured to record the activities initiated by the set of users in a data store of data analytics platform 20 that is indexed by the unique user IDs assigned to the users who initiated the activities. In some examples, upon receipt of a request from audit system 21, data analytics platform 20 may export the data store to audit system 21 for performance of one or more data governance audits on one or more of a per-shared platform basis or a per-user basis.

In addition, data analytics platform 20 may generate data representative of a user interface for display on admin computing device 11 that presents statistics on the shared platforms or "teamspaces" supported by data analytic platform 20. The statistics may include a number of shared platforms, data usage by the users of the shared platforms, and those shared platforms with less than a minimum level of activity for a certain time window.

The techniques of this disclosure may provide one or more advantages. The ability to monitor activities in a shared platform on a per-user basis may provide administrators, e.g., via admin computing device 11, with better control and visibility over data usage, data entitlements, and data management within a business or enterprise. As such, data analytics platform 20 may make it easier for administrators to identify and address potential issues, such as data misuse and/or security breaches. Additionally, the ability to monitor data request and data ingestion activities in the shared platform on a per-user basis may enable administrators to ensure that data ingested into the shared platform is from a reputable source, which may increase the overall credibility of the platform and trust from users and business stakeholders. Automatic data purging may also prevent issues pertaining to data storage and management. For example, data retention policies and/or regulations may define data access restrictions such that customer private data or personal identification information (PII) can only be stored in an accessible database for a certain period of time. The disclosed techniques provide automated monitoring of data usage and storage durations in the shared platform accessible by the set of users of user computing devices 10 and automated purging as necessary under the policies and/or regulations based on the monitored data usage and storage durations. In this way, the disclosed techniques ensure compliance with the applicable policies and/or regulations and avoid potential security and privacy risks for both the business or enterprise and the customers.

Figure 2:
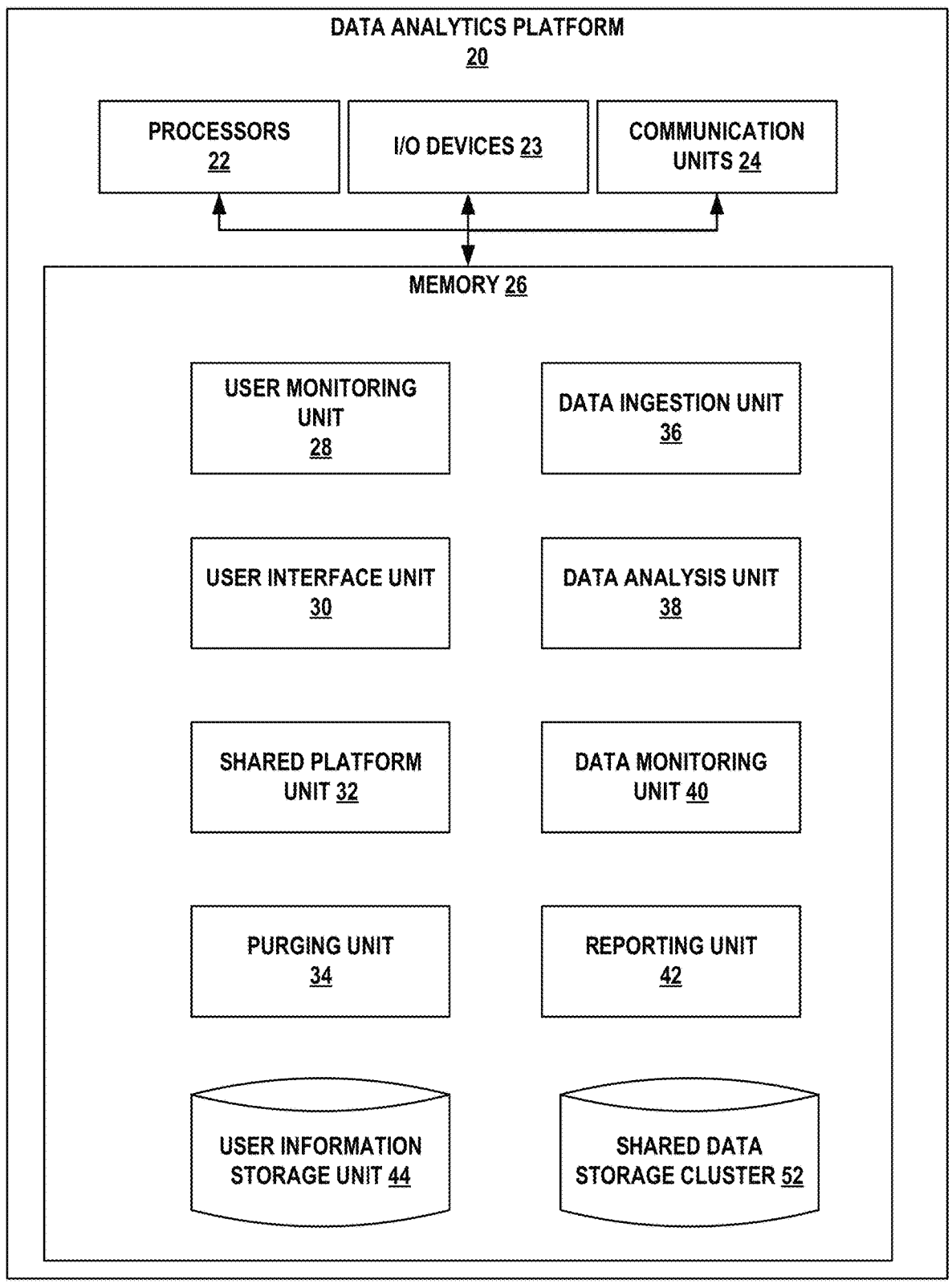
FIG. 2 is a block diagram illustrating an example data analytics platform system, in accordance with one or more techniques of this disclosure.

FIG. 2 a block diagram illustrating an example data analytics platform 20, in accordance with one or more techniques of this disclosure. Data analytics platform 20 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, data analytics platform 20 may represent a cloud computing system, server farm, and/or server cluster (or portion thereof) that provides services to user computing devices, admin computing devices, audit systems, and other devices or systems. In other examples, data analytics platform 20 may represent or be implemented through one or more virtualized computing instances (e.g., virtual machines, containers) of a data center, cloud computing system, server farm, and/or server cluster.

In the example of FIG. 2, data analytics platform 20 includes one or more processors 22, one or more interfaces 23, one or more communication units 24, and one or more memory units 26. In the illustrated FIG. 2 example, memory 26 includes a user monitoring unit 28, a user interface unit 30, a shared platform unit 32, a purging unit 34, a data ingestion unit 36, a data analysis unit 38, a data monitoring unit 40, a reporting unit 42, a user information storage unit 44, and a shared data storage unit 52, each of which may be implemented as program instructions and/or data stored in memory 26 and executable by processors 22 or implemented as one or more hardware units or devices of data analytics platform system 20.

Memory 26 of data analytics platform 20 may also store an operating system (not shown) executable by processors 22 to control the operation of components of data analytics platform 20. Although not shown in FIG. 2, the components, units, or modules of data analytics platform system 20 are coupled (physically, communicatively, and/or operatively) using communication channels for inter-component communications. In some examples, the communication channels may include a system bus, a network connection, an inter-process communication data structure, or any other method for communicating data.

One or more processors 22 data analytics platform 20 may implement functionality and/or execute instructions associated with data analytics platform 20 or associated with one or more modules illustrated herein and/or described below. One or more processors 22 may be, may be part of, and/or may include processing circuitry that performs operations in accordance with one or more aspects of the present disclosure. For example, one or more processors 22 may be capable of processing instructions stored by memory 26. One or more processors 22 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 26 may be configured to store information within data analytics platform 20 during operation. Memory 26 may include a computer-readable storage medium or computer-readable storage device. In some examples, memory 26 includes one or more of a short-term memory or a long-term memory. Memory 26 may include, for example, random access memories (RAM), dynamic random-access memories (DRAM), static random-access memories (SRAM), magnetic discs, optical discs, flash memories, or forms of electrically programmable memories (EPROM) or electrically erasable and programmable memories (EEPROM). In some examples, memory 26 is used to store program instructions for execution by processors 22. Memory 26 may be used by software or applications running on data analytics platform 20 to temporarily store information during program execution.

Data analytics platform 20 may utilize one or more communication units 24 to communicate with external devices via one or more networks, e.g., user computing devices 10, admin computing device 11, and/or audit system 21 of FIG. 1. One or more communication units 24 may be network interfaces, such as Ethernet interfaces, optical transceivers, radio frequency (RF) transceivers, or any other type of devices that can send and receive information. Other examples of such network interfaces may include Wi-Fi, NFC, or Bluetooth® radios. In some examples, data analytics platform 20 utilizes one or more communication unit 24 to communicate with external data sources via one or more networks, e.g., cloud-based data sources 12 via cloud network 16 and/or on-premises data sources 14 via local network 18 of FIG. 1.

One or more input/output (I/O) devices 23 may represent any input devices of data analytics platform 20 not otherwise separately described herein, and one or more output devices of data analytics platform 20 not otherwise separately described herein. I/O devices 23 may generate, receive, and/or process output from any type of device capable of outputting information to a human or machine. For example, one or more I/O devices 23 may generate, receive, and/or process input in the form of electrical, physical, audio, image, and/or visual input (e.g., peripheral device, keyboard, microphone, camera). Correspondingly, one or more I/O devices 23 may generate, receive, and/or process output in the form of electrical and/or physical output (e.g., peripheral device, actuator).

User interface unit 30 of data analytics platform 20 may generate data representative of one or more user interfaces or graphical user interfaces (GUIs) for display on user computing devices 10 and/or admin computing device 11 of FIG. 1. As one example, user interface unit 30 may generate data representative of a GUI for display on user computing devices 10 that allows users to access and interact with data stored within shared data storage cluster 52 and accessible via shared platform unit 32. In some examples, the users of user computing devices 10 may access and interact with the data by performing one or more of requesting data, searching data, storing data, transforming data, analyzing data, visualizing data, and collaborating with other user computing devices.

Data monitoring unit 40 of data analytics platform 20 may be employed to determine a duration for which data is stored within a shared data storage cluster 52 of a particular shared platform supported by shared platform unit 32 of data analytics platform 20. For example, shared data storage cluster 52 of a particular shared platform supported by shared platform unit 32 may include a timestamp for all data stored within shared data storage cluster 52 that indicates when the data was ingested and/or made accessible to the set of users of user computing devices 10. Data monitoring unit 40 may utilize these timestamps to determine a duration for which the data is stored within shared data storage cluster 52 and further determine, based on a duration threshold, e.g., 90 days or 120 days counted from the originating time stamp, whether the duration for which the data has been stored within shared data storage cluster 52 has met or exceeded the threshold duration.

User monitoring unit 28 of data analytics platform 20 may be employed to track and monitor activities initiated by a set of users of user computing devices 10 with respect to the data stored within a particular shared platform supported by shared platform unit 32 of data analytics platform 20 based on unique user IDs assigned to each user of user computing devices 10 that has access to the particular shared platform. In some examples, user monitoring unit 28 may assign the unique user IDs to each user of user computing devices 10. In other examples, the unique user IDs may be associated with the user computing devices 10 or assigned by another system. In some examples, user monitoring unit 28 may be configured to determine user access rights to various data sources for each user based on credentials associated with the user and/or the user computing device. In some examples, user monitoring unit 28 may determine, in response to data monitoring unit 40 determining that a particular portion of the data has been stored within shared data storage cluster 52 of the particular shared platform for a threshold duration, a current level of activity performed by users of user computing devices 10 with respect to the particular portion of the data stored within shared data storage cluster 52.

Processors 22 may record the activities performed by each user computing device in user information storage unit 44, which is indexed by the unique user IDs assigned to the users of user computing devices 10 that initiated the activities. User information storage unit 44 may be a data store comprising a detailed log of all activities performed by users of user computing devices 10 for the purposes of data governance and audit controls. For example, in response to a request from audit system 21 of FIG. 1, processors 22 are configured to export user information storage unit 44 to audit system 21 for performance of one or more data governance audits on one or more of a per-shared platform basis or a per-user basis.

Data ingestion unit 36 may be configured to ingest data from one or more cloud-based data sources 12 via cloud network 16 of FIG. 1 and/or one or more on-premises data sources 14 via local network 18 of FIG. 1 into shared data storage cluster 52 of the particular shared platform supported by shared platform unit 32. For example, in response to a data request from one of the user computing devices 10, processors 22 may access an external system, such as cloud-based data sources 12 or on-premises data sources 14, based on a system ID assigned to the system. Processors 22 may then map the access of the external system based on the system ID to the unique user ID assigned to the requesting user computing device. Data ingestion unit 36 may then initiate ingestion of data directly from at least one of the data sources into a production data storage cluster prior to storing the data in shared data storage cluster 52. The data request and subsequent data ingestion may be monitored activities associated with the unique user ID of the user computing device that are stored in user information storage unit 44.

Shared platform unit 32 may be configured to allow a set of users of user computing devices 10 to access the particular shared platform supported by shared platform unit 32. In some examples, the users may access one or more source code repositories via the particular shared platform, wherein the source code repositories support code collaboration and reuse between the users. For example, data analytics platform 20 may be configured to allow a first user of a user computing device 10A to access one or more source code repositories that are in communication with data analytics platform 20 via a network. Data analytics platform 20 may be further configured to, upon granting the first user of user computing device 10A access to a particular source code repository, allow the first user of user computing device 10A to store source code within the particular source code repository. Data analytics platform 20 may be further configured to allow a second user of user computing device 10A or other user computing device to access the particular source code repository and view and/or collaborate on the source code provided by the first user of user computing device 10A. In some examples, access to and interaction with the one or more source code repositories may be monitored activities associated with the unique user ID of the user computing device that are stored in user information storage unit 44.

Data analysis unit 38 may enable user computing devices 10 to access no-code, low-code, and high-code cloud-based or on-premises analytics tools or platforms, such as Jupyter or Spark, which are in communication with data analytics platform 20 via a network. Data analysis unit 38, for example, may further enable users to build data models and/or visualize data for business insights. Reporting unit 42 may be configured to enable user computing devices 10 to access data reporting tools or platforms, such as Power BI and Tableau, which are in communication with data analytics platform 20 via a network. Reporting unit 42, for example, may allow for the generation of data reports for business insights. In some examples, access to and interaction with external platforms and tools via data analysis unit 38 and reporting unit 42 may be monitored activities associated with the unique user ID of the user computing device that are stored in user information storage unit 44.

Upon data monitoring unit 40 determining that a particular portion of the data stored within shared data unit 52 of data analytics platform system 20 has been stored for a threshold duration, purging unit 34 may determine a current level of activity performed by the set of users of user computing devices 10 with respect to the particular portion of the data stored within shared data unit 52. More specifically, purging unit 34 may determine the current level of activity based on the monitored activities associated with the unique user IDs of user computing devices 10 that are stored within user information storage unit 44. If purging unit 34 determines the current level of activity for the portion of the data stored within shared data unit 52 is less than a minimum level of activity, purging unit 34 may automatically purge the portion of the data from data analytics platform 20. In some examples, the minimum level of activity may comprise no activity with the portion of data stored within shared data unit 52 over a particular time period, e.g., 7 days, 10 days, 30 days, of the like.

In some examples, in response to the portion of the data being stored within the shared platform for the threshold duration and the current level of activity for the portion of the data being less than the minimum level of activity, purging unit 34 may first send a notification to one of user computing devices 10 associated with at least one user of the set of users of the shared platform prior to automatically purging the data. In some examples, the notification generated by purging unit 34 indicates a date by which the portion of the data will be automatically purged from the shared platform. In some examples, data analytics platform 20 may receive, from the one of computing devices 10 in response to the notification, user input data indicating a reason to maintain the portion of the data within the shared platform beyond the threshold duration.

Figure 3:
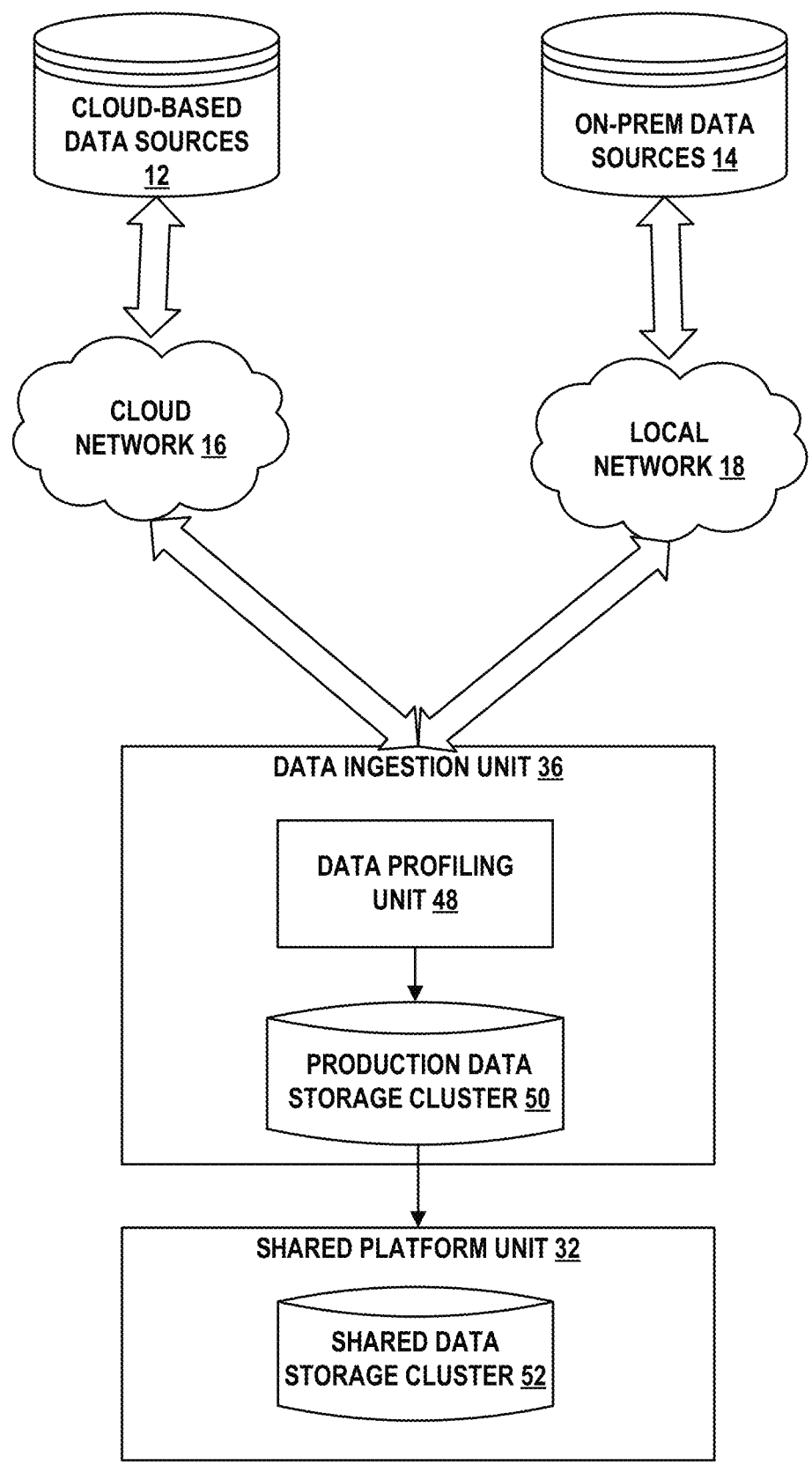
FIG. 3 is a conceptual diagram illustrating an example data ingestion unit of the data analytics platform configured to ingest data from data sources and provide the ingested data to a user accessible shared data storage unit in a shared platform, in accordance with one or more techniques of this disclosure.

FIG. 3 is a conceptual diagram illustrating an example of data ingestion unit 36 of FIG. 2 configured to ingest data from data sources 12, 14 and provide the ingested data to a user accessible shared data storage unit 52 in a shared platform, in accordance with one or more techniques of this disclosure. Data ingestion unit 36 may be configured to support a variety of data formats and protocols, and can ingest data in real-time or on a scheduled basis. In some examples, data ingestion unit 36 may be configured to ingest data in accordance with a specified software development life cycle process in compliance with policies and standards set forth by an enterprise.

In the illustrated example of FIG. 3, data ingestion unit 36 includes a data profiling unit 48 and a production data storage cluster 50. Data profiling unit 48 may be configured to perform data profiling on the ingested data and determine its quality. For example, after data has been ingested from cloud-based data sources 12 via cloud network 16 and/or on-premises data sources 14 via local network 18, data profiling unit 48 of data ingestion unit 36 may determine the quality of the ingested data based on factors such as completeness, consistency, and accessibility. Data profiling unit 48 may further determine whether the data source is reputable and trustworthy. Data profiling unit 48 may, in some examples, assign a score to the ingested data that indicates its level of quality. If the score assigned to the ingested data meets a specified threshold, the data may then be stored in production data storage cluster 50.

Production data storage cluster 50 may not be accessible by users of user computing devices 10. Data ingestion unit 36 and/or shared platform unit 32 may, upon creation of the particular shared platform for the set of users, mirror the data stored within production data storage cluster 50 into shared data storage cluster 52. Shared data storage cluster 52 is accessible to the set of users of user computing devices 10 via the shared platform supported by shared platform unit 32. Both production data storage cluster 50 and production data storage cluster 52 may support a variety of data types and sizes and may be configured to automatically back up and replicate data for disaster recovery. As described herein, the duration for which data is stored within data analytics platform 20 and the current level of activity for data stored within data analytics platform 20 is monitored with respect to shared platform 32 and/or shared data storage cluster 52. Further, purging unit 34 of FIG. 2 may only automatically purge a particular portion of data from shared platform 32 and/or shared data storage cluster 52, e.g., upon the particular portion of data being purged from shared platform 32 and/or shared data storage cluster 52, the particular portion of data is still maintained or stored in production storage cluster 50.

Figure 4:
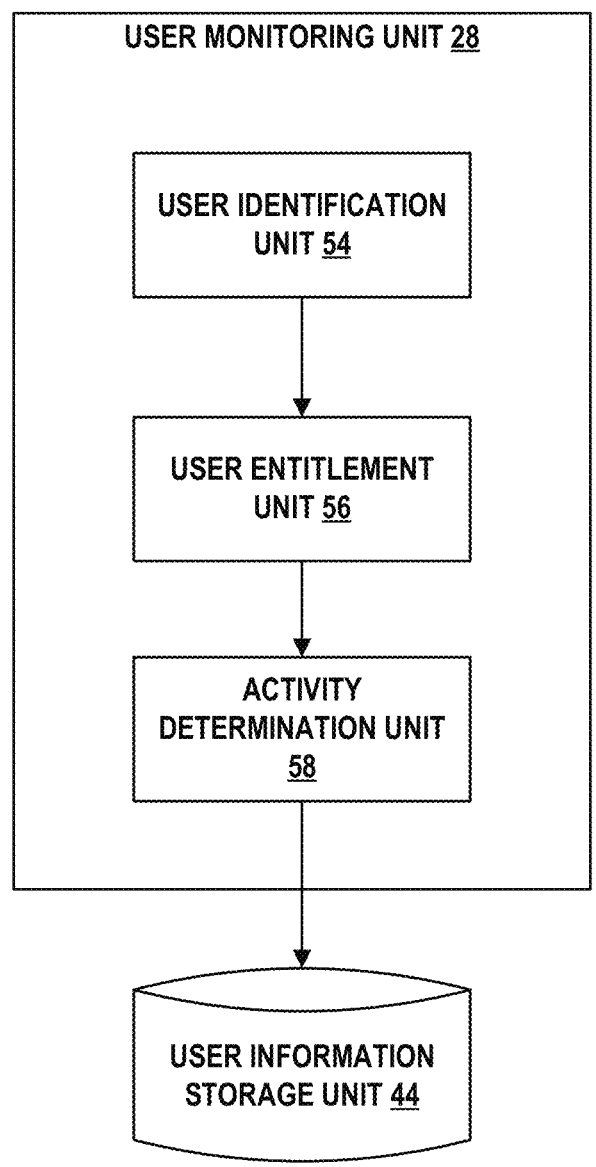
FIG. 4 is a conceptual diagram illustrating an example user monitoring unit of the data analytics platform configured to monitor user activities in the shared platform on a per-user basis, in accordance with one or more techniques of this disclosure.

FIG. 4 is a conceptual diagram illustrating an example user monitoring unit 28 of FIG. 2 configured to monitor user activities in the shared platform on a per-user basis, in accordance with one or more techniques of this disclosure. In the illustrated example of FIG. 4, user monitoring unit 28 includes a user identification unit 54, a user entitlement unit 56, and an activity determination unit 58.

User identification unit 54 of user monitoring unit 28 may assign each user of user computing devices 10 a unique user ID that can be used to monitor each user computing device with access to data analytics platform 20. In other examples, rather than user monitoring unit 28 assigning each user of user computing devices 10 a new unique user ID, the unique user IDs may be associated with the user computing devices 10 or assigned by another unit or system. Each activity performed by a user computing device within data analytics platform 20 may be logged with the unique user ID.

User entitlement unit 56 may further determine user access rights to data stored within or accessible by data analytics platform system 20 on a per-user basis. For example, prior to gaining access to a particular shared platform of data analytics platform 20, a user of a user computing device may have to enter credentials associated with the user and/or the user computing device. User entitlement unit 56 may then determine whether the credentials entered by the user are correct or provide the user access rights, and upon determining the credentials are correct or provide the user access rights, user entitlement unit 56 may allow the user to access the particular shared platform of data analytics platform 20.

Activity determination unit 58 may then determine activities performed by the user computing device with respect to a particular portion of data stored within shared data storage cluster 52 and accessible via shared platform 32. For example, a user of a user computing devices sending a data request may be logged or recorded by activity determination unit 58 in user information storage unit 44 as a first activity, and the user of the user computing device later access and analyzing the data via the shared platform may be logged or recorded by activity determination unit 58 in user information storage unit 44 as a second activity. Each activity performed or initiated by a user of a user computing device may be stored in user information storage unit 44 that is indexed by the unique user ID assigned to the user. Upon data monitoring unit 40 of FIG. 2 determining that a particular portion of the data stored within data analytics platform system 20 has been stored for a threshold duration, purging unit 34 may determine the level of activity for the particular portion of the data from information storage unit 44. For example, purging unit 34 may determine that 5 activities were recorded for the particular portion of the data over a particular time period, e.g., 7 days, 10 days, 30 days, of the like. If the minimum level of activity for the shared platform is 10 activities over the time period, for example, purging unit 34 may then automatically purge the portion of the data from data analytics platform 20.

Figure 5:
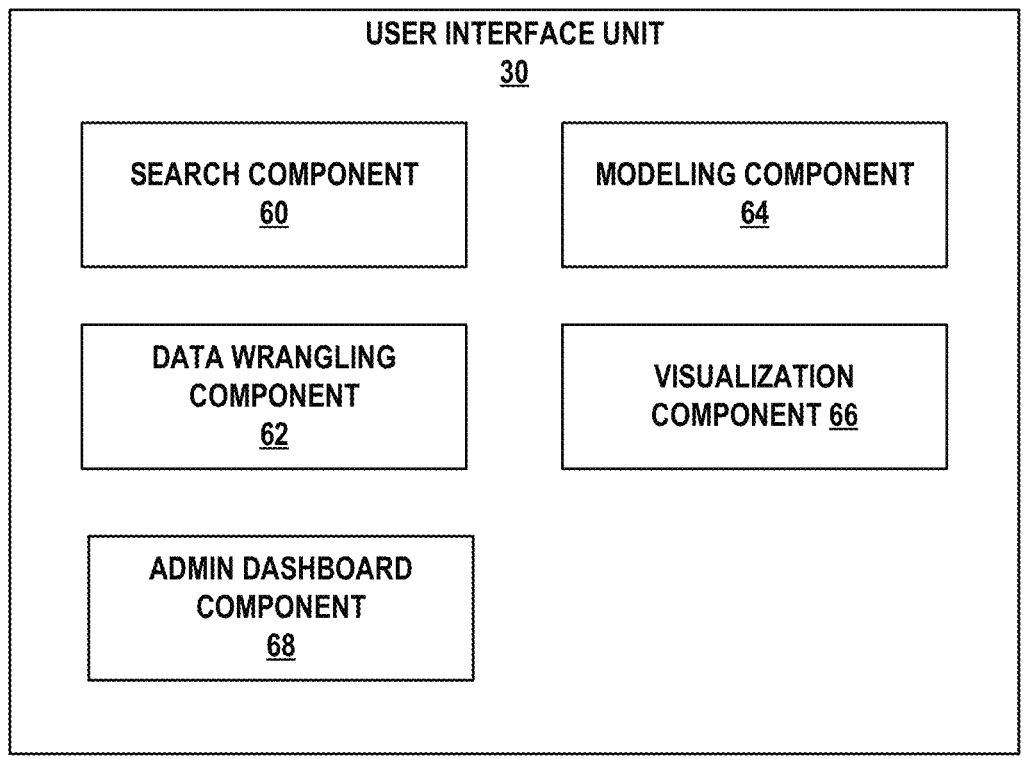
FIG. 5 is a block diagram illustrating an example user interface unit of the data analytics platform, in accordance with one or more techniques of this disclosure.

FIG. 5 is a block diagram illustrating an example user interface unit 30 of FIG. 2, in accordance with one or more techniques of this disclosure. As illustrated in FIG. 5, user interface 30 further comprises a search component 60, a data wrangling component 62, a modeling component 64, and a visualization component 66.

Search component 60 may be configured to output data representative of a GUI for display on user computing devices 10 that includes a search request field or other component configured to receive a search request from a user of user computing devices 10. Search component 60 may be further configured to, upon receiving a search request from a user of computing devices 10, perform a search in a data catalog such as shared data storage unit 52 for data specified in the search request.

Data wrangling component 62 may be configured to output data representative of a GUI for display on user computing devices 10 that includes a field configured to allow a user of user computing devices 10 to request access to no-code, low-code, and high-code development platforms for the purpose of transforming data. Data wrangling unit 62 may be further configured to, upon receiving a request from a user of computing devices 10, allow the user to access the no-code, low-code, and high-code development platforms that are in communication with data analytics platform 20 via a network.

Modeling component 64 may be configured to output data representative of a GUI for display on user computing devices 10 that includes a field configured to allow a user of user computing devices 10 to request access to one or more cloud-based or on-premises analytics tools or platforms for the purpose of building data models. Modeling component 64 may be further configured to, upon receiving a request from a user of computing devices 10, allow the user to access the one or more cloud-based or on-premises analytics tools or platforms that are in communication with data analytics platform 20 via a network.

Data visualization component 66 may be configured to output data representative of a GUI for display on user computing devices 10 that includes a field configured to allow a user of user computing devices 10 to request access to one or more cloud-based or on-premises data visualization tools or platforms for the purpose of visualizing data for business insights. Data visualization component 66 may be further configured to, upon receiving a request from a user of computing devices 10, allow the user to access the one or more cloud-based or on-premises data visualization tools or platforms that are in communication with data analytics platform 20 via a network.

Admin dashboard component 68 may be configured to output data representative of a GUI for display on admin computing device 11 that includes a dashboard showcasing data usage and duration tracking within data analytics platform 20. More specifically, admin dashboard component 68 may generate data representative of a user interface for display on admin computing device 11 that presents statistics on the shared platforms or "teamspaces" supported by data analytics platform 20, wherein the statistics may include a number of shared platforms, data usage by the users of the shared platforms, and those shared platforms with less than a minimum level of activity for a particular time period.

Figure 6:
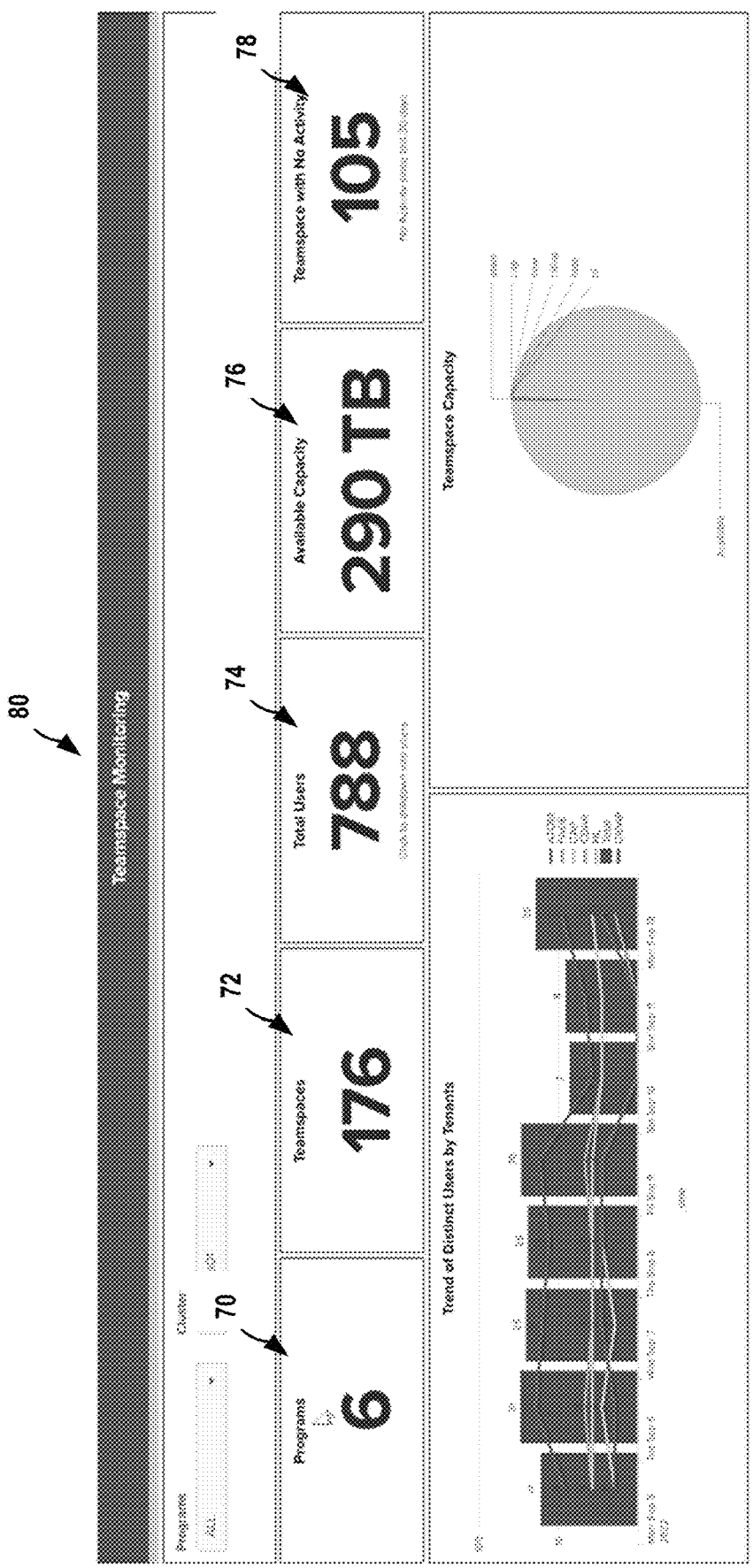
FIG. 6 is a conceptual diagram illustrating an example user interface presented by an administrator computing device for monitoring user activities and data usage in the shared platform.

FIG. 6 is a conceptual diagram illustrating an example user interface 80 presented by an administrator computing device, such as admin computing device 11 from FIG. 1, for monitoring user activities and data usage in the data analytics platform. As illustrated in FIG. 6, teamspace monitoring user interface 80 includes various components that provide information pertaining to activity levels of different share platforms or "teamspaces" within data analytics platform 20, such as programs component 70, teamspaces component 72, total users component 74, available capacity component 76, and inactive teamspaces component 78.

In some examples, programs component 70 may display, via teamspace monitoring user interface 80, a number of programs for which data analytics platform 20 provides shared platforms or teamspaces. In some examples, teamspaces component 72 may display, via teamspace monitoring user interface 80, a total number of shared platforms or teamspaces supported by data analytics platform 20 across all programs. In some examples, total users component 74 may display, via teamspace monitoring user interface 80, a total number of users with access to at least one shared platform or teamspace supported by the data analytics platform 20. In some examples, available capacity component 76 may display, via teamspace monitoring user interface 80, an available data capacity of all shared platforms or teamspaces supported by data analytics platform 20, which may pertain to data storage capacity. In some examples, inactive teamspaces component 78 may display, via teamspace monitoring user interface 80, a current number of inactive shared platforms or teamspaces supported by data analytics platform 20. For example, inactive teamspaces component 78 may display the number of shared platforms or teamspaces in which no user activity with respect to the portion of data stored within the respective teamspace has occurred over a particular time period, e.g., 7 days, 10 days, 30 days, or the like. In some examples, the level of activity of each teamspace may be determined by, for example, user monitoring unit 28 of data analytics platform 20. Teamspace monitoring user interface 80 may provide administrators using admin computing device 11 with a holistic view of the shared platforms or teamspaces supported by data analytics platform 20.

FIG. 7 is a conceptual diagram illustrating an example user interface 90 presented by an administrator computing device, such as admin computing device 11 from FIG. 1, for monitoring data usage and data access in the shared platform. As illustrated in FIG. 7, teamspace information user interface 90 includes various components that provide information pertaining to data usage of different shared platforms or teamspaces supported by data analytics platform 20, such as volume name component 92, quota component 94, total usage component 96, create date component 98, and last access date component 100.

In some examples, volume name component 92 may display, via teamspace information user interface 90, names of each shared platform or teamspace supported by data analytics platform 20. In some examples, quota component 94 may display, via teamspace information user interface 90, a total amount of storage space available in a shared data storage cluster for each shared platform or teamspace supported by data analytics platform 20. In some examples, total usage component 96 may display, via teamspace information user interface 90, a current amount of storage space used by each shared platform or teamspace supported by data analytics platform 20. In some examples, create date component 98 may display, via teamspace information user interface 90, a date on which each shared platform or teamspace was created within data analytics platform 20 or a date on which data was mirrored to the shared data storage cluster for each shared platform or teamspace supported by data analytics platform 20. In some examples, the create date may be used to measure a duration for which data is stored within the shared data storage cluster for each shared platform or teamspace. In some examples, last access date component 100 may display, via teamspace information user interface 90, a most recent date that each shared platform or teamspace was accessed by a user of the set of users with access to the respective shared platform or teamspace. In some examples, the last access date may be used to determine a current level of activity for a portion of data stored within the shared data storage cluster for each shared platform or teamspace supported by data analytics platform 20.

Figure 8:
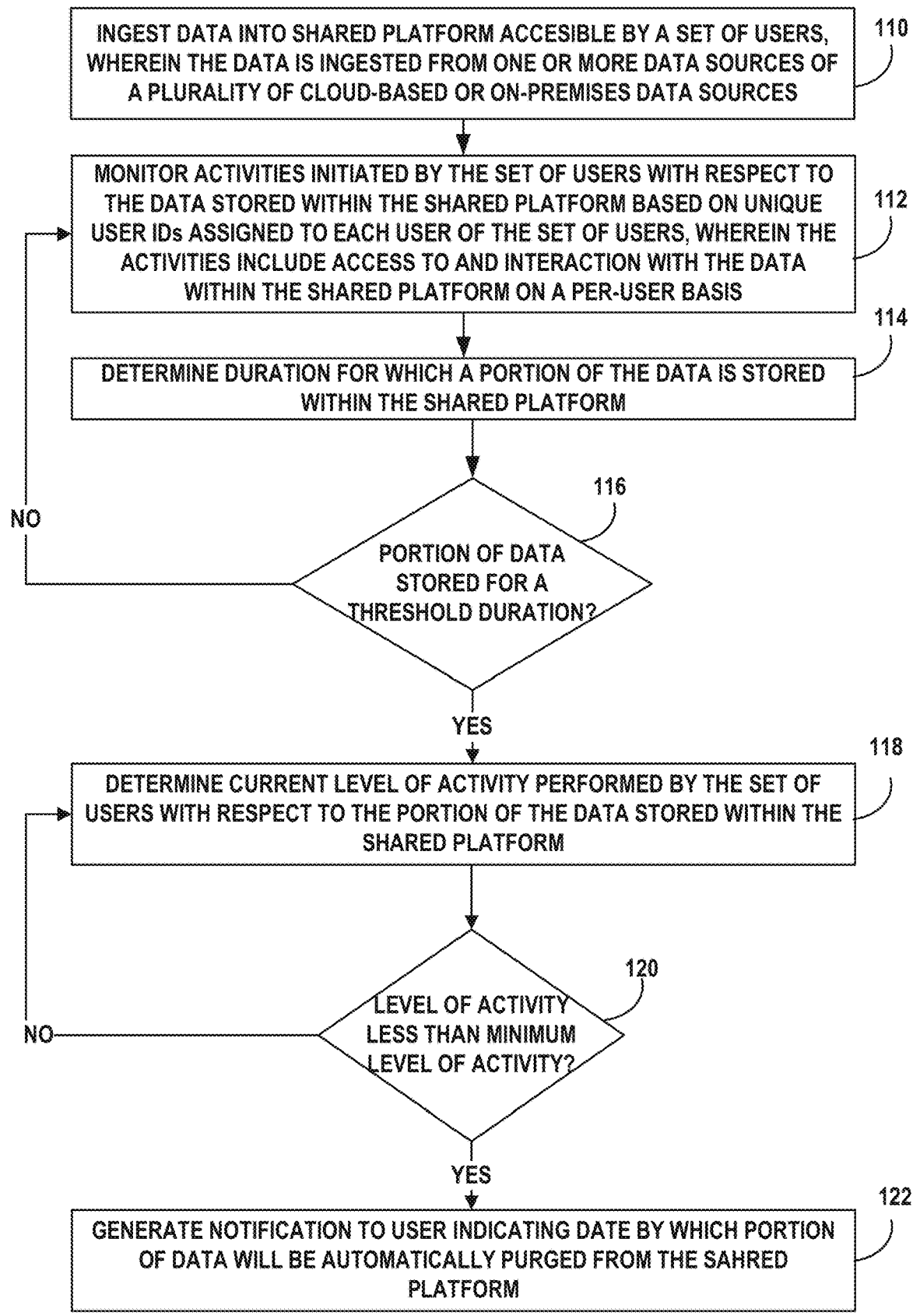
FIG. 8 is a flowchart illustrating an example operation of monitoring user activities in the shared platform on a per-user basis and automatically purging data from the shared data storage unit based on data usage, in accordance with one or more techniques of this disclosure.

FIG. 8 is a flowchart illustrating an example operation of monitoring user activities in the shared platform on a per-user basis and automatically purging data from the shared data storage unit based on data usage, in accordance with one or more techniques of this disclosure. The example operation is described herein with respect to data analytics platform 20 of FIGS. 1-2. In other examples, other systems and/or computing devices may perform the example operation of FIG. 8.

Data analytics platform 20 ingests data into a shared platform supported by shared platform unit 32 that is accessible by a set of users associated with user computing devices 10, wherein the data is ingested from one or more data sources of a plurality of cloud-based data sources 12 or on-premises data sources 14 (110). Data analytics platform 20 may ingest base data directly from the one or more data sources 12, 14 into a production data storage cluster that is not accessible by the set of users. Data analytics platform 20 may then mirror the base data from the one or more data sources 12, 14 into shared data storage cluster 52 of the shared platform that is accessible by the set of users. In one example, in response to a data request from one of the users of the set of users, data analytics platform 20 may initiate ingestion of data directly from at least one of the data sources 12, 14 into the production data storage cluster, wherein the data request and subsequent data ingestion are monitored activities associated with a unique user ID of the one of the users.

Data analytics platform 20 monitors activities initiated by the set of users of user computing devices 10 with respect to the data stored within shared data storage cluster 52 of the shared platform based on unique user IDs assigned to each user of the set of users, wherein the activities include access to and interaction with the data within the shared platform on a per-user basis (112). For example, data analytics platform 20 may record the activities in user information storage unit 44 indexed by the unique user IDs assigned to the users who initiated the activities. In response to a request from audit system 21, for example, data analytics platform 20 may export the data within user information storage unit 44 to audit system 21 for performance of one or more data governance audits on one or more of a per-shared platform basis or a per-user basis.

In some examples, data analytics platform 20 may, in response to a data request from one of the users of the set of users via user computing devices 10, access an external system based on a system ID assigned to the system and map the access of the external system based on the system ID to a unique user ID assigned to the requesting user. In other examples, data analytics platform 20 may monitor access to one or more source code repositories based on a unique user ID of a user of the set of users who initiated the access, wherein the one or more source code repositories are configured to support code collaboration and reuse between the users of the set of users. In further examples, data analytics platform 20 may generate data representative of a user interface for display on user computing devices 10 associated with the set of users, the user interface comprising a search component configured receive search requests from the set of users via the associated user computing devices 10. Data analytics platform 20 may then perform a search in a data catalog for data specified in a search request received from a user of the set of users, wherein the data catalog comprises the data ingested from the one or more data sources 12, 14. Data analytics platform 20 may monitor the search based on the unique user ID of the user of the set of users from which the search request was received.

Data analytics platform 20 determines a duration for which a portion of data is stored within the shared platform (114). Data analytics platform 20 may be configured to monitor a duration for which the data is stored within the shared platform and determine that the portion of the data has been stored within the shared platform for the threshold duration, e.g., 90 days or 120 days. If the portion of data has not been stored within the shared platform for a threshold duration (NO branch of 116), data analytics platform 20 continues to monitor activities of the sets of users with respect to the data stored within the shared platform (112).

If the portion of data has been stored within the shared platform for a threshold duration (YES branch of 116), data analytics platform 20 next determines the current level of activity performed by the set of users with respect to the portion of the data stored within shared data storage cluster 52 of the shared platform (118). For example, data analytics platform 20 may determine the current level of activity for the portion of the data based on the monitored activities initiated by the set of users with respect to the portion of the data stored within the shared platform, as recorded in user information storage unit 44, over a particular time period, e.g., 7 days, 10 days, 30 days, of the like.

If the current level of activity is equal to or greater than a minimum level of activity (NO branch of 120), data analytics platform 20 automatically maintains the portion of the data within shared data storage cluster 52 of the shared platform. Data analytics platform 20 then continues to monitor the current level of activity performed by the set of users with respect to the portion of the data stored within the shared platform (118). In some examples, the minimum level of activity may be no activity or a nominal number of activities, e.g., 5 or 10 activities, with respect to the portion of the data within shared data storage cluster 52 of the shared platform over the particular time period.

If the current level of activity is less than the minimum level of activity (YES branch of 120), data analytics platform 20 may send a notification to at least one user of the set of users of the shared platform, the notification indicating a date by which the portion of data will be automatically purged from shared data storage cluster 52 of the shared platform (122). Data analytics platform 20 then automatically purges the portion of data from shared data storage cluster 52 of the shared platform. More specifically, data analytics platform 20 may purge, remove, or delete the data from shared data storage cluster 52 of the shared platform while still maintaining the base data in the production data storage cluster. In some examples, data analytics platform 20 may receive, from the at least one user in response to the notification, user input data indicating a reason to maintain the portion of the data within shared data storage cluster 52 of the shared platform beyond the threshold duration. Data analytics platform 20 may, based on the provided reason, pause, delay, or cancel the automatic purge of the portion of data from shared data storage cluster 52 of the shared platform.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The disclosures of all publications, patents, and patent applications referred to herein are hereby incorporated by reference. To the extent that any such disclosure material that is incorporated by reference conflicts with the present disclosure, the present disclosure shall control.

For ease of illustration, only a limited number of devices or systems are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated herein as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random access memory (RAM), read-only memory (ROM), electrically erasable and programmable ROM (EEPROM), compact disc ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application-specific integrated circuits (ASICs), field-programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A system, comprising:
   a memory that stores executable components;
   one or more processors in communication with the memory and configured to:
   ingest data into a shared platform accessible by a set of users, wherein the data is ingested from one or more data sources of a plurality of data sources that are external to the shared platform, wherein the plurality of data sources includes one or more cloud-based data sources or one or more on-premises data sources, and wherein the set of users includes at least two users;
   monitor activities initiated by the set of users with respect to the data stored within the shared platform based on unique user identifiers (IDs) assigned to each user of the set of users, wherein the activities include access to and interaction with the data within the shared platform on a per-user basis;
   in response to a portion of the data being stored within the shared platform for a threshold duration, determine a current level of activity for the portion of the data within the shared platform based on the activities initiated by the set of users with respect to the portion of the data; and
   in response to the current level of activity for the portion of the data being less than a minimum level of activity, automatically purge the portion of the data from the shared platform.

2. The system of claim 1, wherein, to monitor the activities initiated by the set of users, the one or more processors are configured to record the activities in a data store indexed by the unique user IDs assigned to the users who initiated the activities.

3. The system of claim 2, wherein, in response to a request from an audit system, the one or more processors are configured to export the data store to the audit system for performance of one or more data governance audits on one or more of a per-shared platform basis or a per-user basis.

4. The system of claim 1, wherein, to monitor the activities initiated by the set of users, the one or more processors are further configured to:
   in response to a data request from one of the users of the set of users, access an external system based on a system ID assigned to the system; and
   map the access of the external system based on the system ID to a unique user ID assigned to the requesting user.

5. The system of claim 1, wherein to ingest the data into the shared platform, the one or more processors are configured to:
   ingest base data directly from the one or more data sources into a production data storage cluster that is not accessible by the set of users; and
   mirror the base data from the one or more data sources into a shared data storage cluster of the shared platform that is accessible by the set of users.

6. The system of claim 5, wherein to ingest the data into the shared platform, the one or more processors are configured to, in response to a data request from one of the users of the set of users, initiate ingestion of data directly from at least one of the data sources into the production data storage cluster, wherein the data request and subsequent data ingestion are monitored activities associated with a unique user ID of the one of the users.

7. The system of claim 5, wherein to automatically purge the portion of the data from the shared platform, the one or more processors are configured to purge the portion of the data from the shared data storage cluster of the shared platform and maintain the base data in the production data storage cluster.

8. The system of claim 1, wherein the one or more processors are further configured to:
   generate data representative of a user interface for display on computing devices associated with the set of users, the user interface comprising a search component configured receive search requests from the set of users via the associated computing devices;
   perform a search in a data catalog for data specified in a search request received from a user of the set of users, wherein the data catalog comprises the data ingested from the one or more data sources of the plurality of data sources, and
   wherein, to monitor the activities initiated by the set of users, the one or more processors are configured to monitor the search based on a unique user ID of the user of the set of users from which the search request was received.

9. The system of claim 1, wherein, to monitor the activities initiated by the set of users, the one or more processors are configured to monitor access to one or more source code repositories based on a unique user ID of a user of the set of users who initiated the access, wherein the one or more source code repositories are configured to support code collaboration and reuse between the users of the set of users.

10. The system of claim 1, wherein the one or more processors are configured to:
    monitor a duration for which the data is stored within the shared platform; and
    determine that the portion of the data has been stored within the shared platform for the threshold duration.

11. The system of claim 1, wherein, in response to the portion of the data being stored within the shared platform for the threshold duration and the current level of activity for the portion of the data being less than the minimum level of activity, the one or more processors are configured to send a notification to at least one user of the set of users of the shared platform, the notification indicating a date by which the portion of the data will be automatically purged from the shared platform.

12. The system of claim 11, wherein the one or more processors are configured to receive from the at least one user in response to the notification, user input data indicating a reason to maintain the portion of the data within the shared platform beyond the threshold duration.

13. The system of claim 1, wherein the one or more processors are configured to, in response to the current level of activity for the portion of the data being greater than or equal to the minimum level of activity, automatically maintain the portion of the data within the shared platform.

14. A method comprising:
ingesting data into a shared platform accessible by a set of users, wherein the data is ingested from one or more data sources of a plurality of data sources that are external to the shared platform, wherein the plurality of data sources includes one or more cloud-based data sources or one or more on-premises data sources, and wherein the set of users includes at least two users;
monitoring activities initiated by the set of users with respect to the data stored within the shared platform based on unique user identifiers (IDs) assigned to each user of the set of users, wherein the activities include access to and interaction with the data within the shared platform on a per-user basis;
in response to a portion of the data being stored within the shared platform for a threshold duration, determining a current level of activity for the portion of the data within the shared platform based on the activities initiated by the set of users with respect to the portion of the data; and
in response to the current level of activity for the portion of the data being less than a minimum level of activity, automatically purging the portion of the data from the shared platform.

15. The method of claim 14, wherein monitoring the activities initiated by the set of users comprises recording the activities in a data store indexed by the unique user IDs assigned to the users who initiated the activities.

16. The method of claim 15, further comprising, in response to a request from an audit system, exporting the data store to the audit system for performance of one or more data governance audits on one or more of a per-shared platform basis or a per-user basis.

17. The method of claim 14, wherein ingesting the data into the shared platform comprises:
ingesting base data directly from the one or more data sources into a production data storage cluster that is not accessible by the set of users; and
mirroring the base data from the one or more data sources into a shared data storage cluster of the shared platform that is accessible by the set of users.

18. The method of claim 17, wherein automatically purging the portion of the data from the shared platform comprises purging the data from the shared data storage cluster of the shared platform and maintaining the base data in the production data storage cluster.

19. A non-transitory computer-readable storage medium storing instructions that, when executed, cause one or more processors to:
ingest data into a shared platform accessible by a set of users, wherein the data is ingested from one or more data sources of a plurality of data sources that are external to the shared platform, wherein the plurality of data sources includes one or more cloud-based data sources or one or more on-premises data sources, and wherein the set of users includes at least two users;
monitor activities initiated by the set of users with respect to the data stored within the shared platform based on unique user identifiers (IDs) assigned to each user of the set of users, wherein the activities include access to and interaction with the data within the shared platform on a per-user basis;
in response to a portion of the data being stored within the shared platform for a threshold duration, determine a current level of activity for the portion of the data within the shared platform based on the activities initiated by the set of users with respect to the portion of the data; and
in response to the current level of activity for the portion of the data being less than a minimum level of activity, automatically purge the portion of the data from the shared platform.

* * * * *